United States Patent
Galin

(10) Patent No.: US 11,951,893 B2
(45) Date of Patent: Apr. 9, 2024

(54) INTERLOCKING RECONFIGURABLE MODULAR LOCKERS

(71) Applicant: Ford Global Technologies, LLC, Dearborn, MI (US)

(72) Inventor: John Galin, Mill Valley, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 747 days.

(21) Appl. No.: 17/132,896

(22) Filed: Dec. 23, 2020

(65) Prior Publication Data
US 2022/0197289 A1     Jun. 23, 2022

(51) Int. Cl.
*B60P 1/43* (2006.01)
*B60L 50/60* (2019.01)
(Continued)

(52) U.S. Cl.
CPC ............ *B60P 1/43* (2013.01); *B60L 50/66* (2019.02); *B60P 1/36* (2013.01); *B60P 3/007* (2013.01);
(Continued)

(58) Field of Classification Search
CPC .... B60P 1/43; B60P 1/36; B60P 3/007; B65D 21/0212; B65D 43/0216; B65D 2203/12
(Continued)

(56) References Cited

U.S. PATENT DOCUMENTS 3,251,460 A * 5/1966 Edmonds ............. B65D 81/022
                                                    220/675
6,003,706 A * 12/1999 Rosen ................... B65D 21/083
                                                    220/4.26
(Continued)

FOREIGN PATENT DOCUMENTS

CN   110303969 A  * 10/2019  ................ B60P 1/36
GB   2546583 A    *  7/2017  ............. A47G 29/14

OTHER PUBLICATIONS

Hofbaur et al., "Modular Re-Configurable Robot Drives", 2010 IEEEConference on Robotics, Automation and Mechatronics, IEEEXPLORE Digital Library, Jun. 30, 2010, 6 pages.

*Primary Examiner* — J. Gregory Pickett
*Assistant Examiner* — Niki M Eloshway
(74) *Attorney, Agent, or Firm* — Brandon Hicks; Eversheds Sutherland (US) LLP

(57) ABSTRACT

A modular robot system which may be configured to accommodate packages of varying sizes is provided. The modular robot may include a base have omni-directional wheels and cameras and sensors, one or more modular containers, and a lid, which may be releasably linked together to form a small, medium or larger units. The base, one or more modular containers, and the lid may be electrically linked to provide information to be used in a number of ways. For example, the electrical link may allow two or more modular robots to communicate with each other, enable external displays of multiple modules to act as one large unit, control the motion of the drawers, e.g., allowing them to open/close, and allow the processor(s) in the lid to communicate with the drive system of the omni-directional wheels. A set of alternating interlocking rails and tracks on corresponding surfaces enable the various layers of the modular robot to interlock with one another. Interlocking of multiple modular containers may be established by sliding one surface over the other. These sections may be used to create modular robots of varying sizes.

20 Claims, 15 Drawing Sheets

(51) Int. Cl.
*B60P 1/36* (2006.01)
*B60P 3/00* (2006.01)
*B60P 9/00* (2006.01)
*B65D 21/02* (2006.01)
*B65D 43/02* (2006.01)

(52) U.S. Cl.
CPC ............ *B60P 9/00* (2013.01); *B65D 21/0212* (2013.01); *B65D 43/0216* (2013.01); *B65D 2203/12* (2013.01)

(58) Field of Classification Search
USPC ...................................... 220/23.6, 4.03, 4.26
See application file for complete search history.

(56) References Cited

U.S. PATENT DOCUMENTS

| | | | |
|---|---|---|---|
| 7,562,784 B2* | 7/2009 | Stevenson | B65D 11/1893 |
| | | | 220/4.26 |
| 10,538,190 B1* | 1/2020 | Metellus | B60F 5/02 |
| 11,548,373 B1* | 1/2023 | Kurczewski | B60K 11/08 |
| 2007/0051721 A1* | 3/2007 | Wu | B65D 21/0201 |
| | | | 220/23.6 |
| 2017/0057081 A1 | 3/2017 | Krohne et al. | |
| 2019/0023334 A1 | 1/2019 | Akin et al. | |
| 2020/0094280 A1 | 3/2020 | Holloway et al. | |
| 2020/0125110 A1* | 4/2020 | Sibley | B25J 9/1694 |
| 2020/0393854 A1* | 12/2020 | Romanucci | G05D 1/12 |
| 2021/0308860 A1* | 10/2021 | Skaaksrud | B25J 19/02 |
| 2021/0394660 A1* | 12/2021 | Crawford, Jr. | G05D 1/0225 |
| 2022/0092673 A1* | 3/2022 | Ferguson | G05D 1/0033 |
| 2023/0083532 A1* | 3/2023 | Sibley | B66F 9/0755 |
| | | | 414/217 |

* cited by examiner

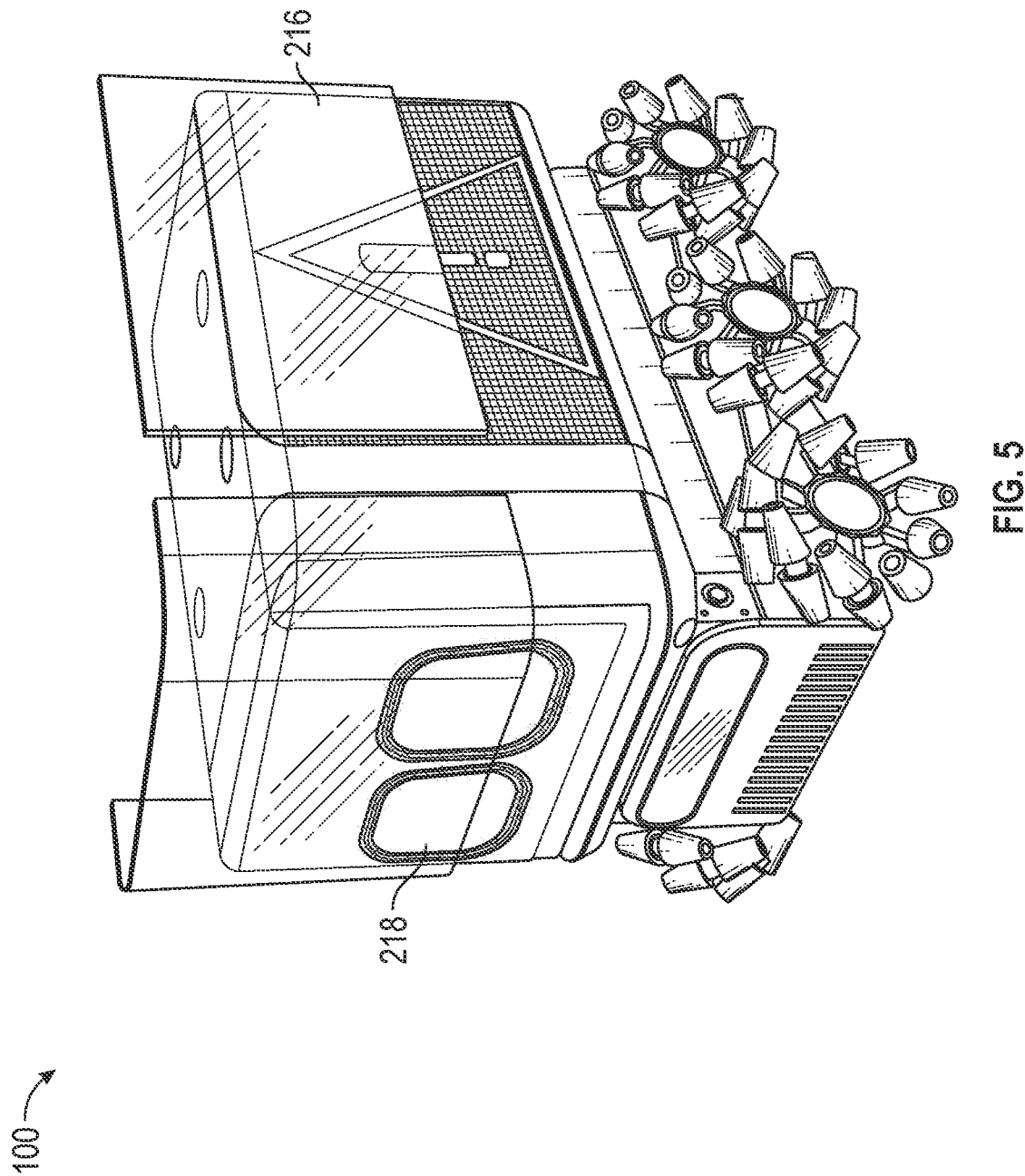

INTERLOCKING RECONFIGURABLE MODULAR LOCKERS

BACKGROUND

Worldwide e-commerce spending is increasing, resulting in an increase in package delivery operations. In order to improve hourly throughputs to meet the increase in demand, it is important to examine every aspect of delivery operation and cut any time wasted in the delivery process. It is with respect to these and other considerations that the disclosure made herein is presented.

BRIEF DESCRIPTION OF THE DRAWINGS

FIG. 5 illustrates the screens of the interlocking reconfigurable modular robot in accordance with the principles of the present disclosure.

DETAILED DESCRIPTION

Overview

Figure 1:
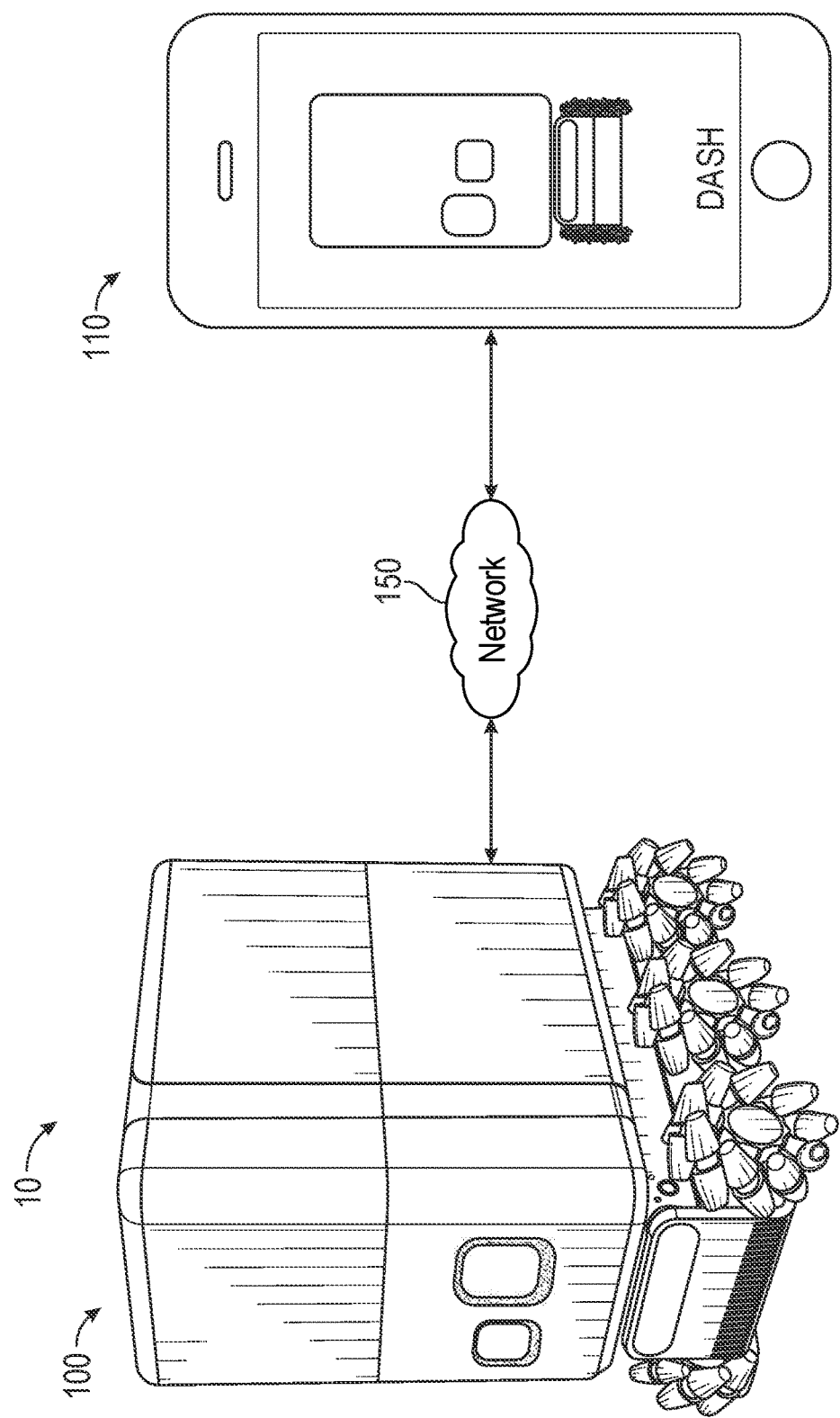
FIG. 1 illustrates a system for delivering items using an interlocking reconfigurable modular locker in accordance with the principles of the present disclosure.

A modular robot system which may be configured to accommodate packages of varying sizes is provided. The robot may include omni-directional wheels, a lower layer having sensors/cameras and power/data link, and a upper layer having a control top. In-between the two layers are modular units which may be linked together to form a small, medium or larger units. The power/data link provides a connection/communication link which may be utilized to provide information to be used in a number of ways. For example, the connection/communication link may allow two or more modules to communicate with each other, enable external displays of multiple modules to act as one large unit, control the motion of the drawers, e.g., allowing them to open/close, and allow the processor(s) in the control top to communicate with the drive system of the omni-directional wheels. A set of alternating interlocking raised and lowered sections on corresponding surfaces enable the various layers of the module to interlock with one another. Interlocking of multiple modules may be established by sliding one surface over the other. These sections may be used to create robot containers of varying sizes and may allow multiple robots to interlock together to carry even larger packages.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination to form additional hybrid implementations of the present disclosure. For example, any of the functionality described with respect to a particular device/component may be performed by another device/component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art.

Referring now to FIG. 1, system 10 for delivering items packages of varying sizes is provided. System 10 includes modular robot 100 and further may include mobile application 110 installed on, e.g., smartphone or tablet. Modular robot 100 and mobile application 110 may be communicatively coupled via, e.g., network 150. Network 150 may include any one, or a combination of networks, such as a local area network (LAN), a wide area network (WAN), a telephone network, a cellular network, a cable network, a wireless network, and/or private/public networks, such as the Internet. For example, network 150 may support communication technologies, such as TCP/IP, Bluetooth, cellular, near-field communication (NFC), Wi-Fi, Wi-Fi direct, machine-to-machine communication, and/or man-to-machine communication. Mobile application 110 may be used by a user to communicate commands to modular robot 100 and/or receive information indicative of, e.g., status of modular robot 100 or delivery status, as described in further detail below.

Figure 2A:
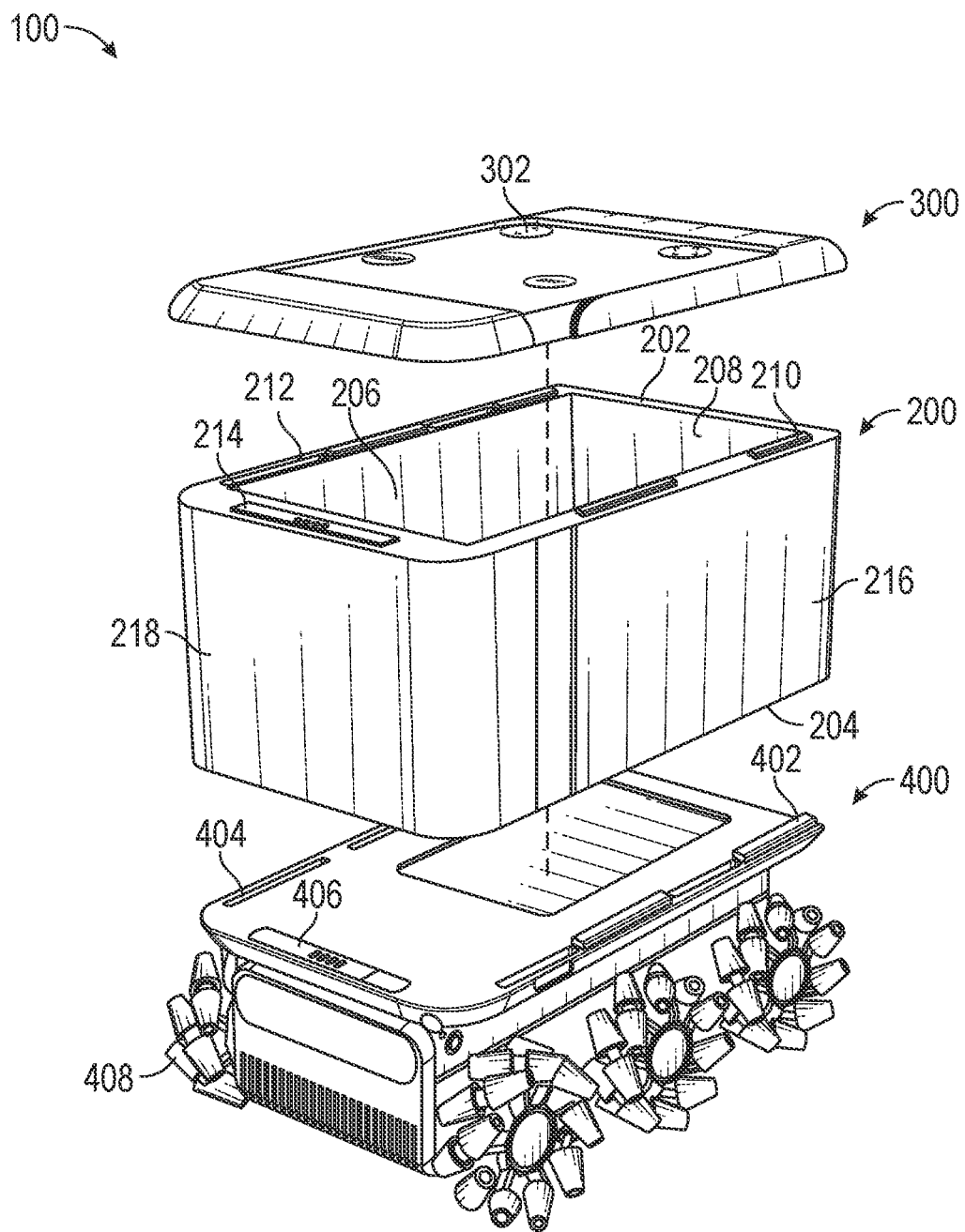
FIG. 2A illustrates the components of an interlocking reconfigurable modular robot in accordance with the principles of the present disclosure.

Referring now to FIG. 2A to 2D, an exemplary interlocking reconfigurable modular robot is provided. As shown in FIG. 2A, modular robot 100 may include one or more modular containers, e.g., modular container 200, lid 300, and base 400. Multiple modular containers may be stacked and/or otherwise coupled together to increase or decrease the available compartment size depending on the size of the package to be delivered. Specifically, each of the one or more modular containers, lid 300, and base 400, may include a set of rails and tracks, which may releasably engage with each other to provide the various modular robot configurations described herein.

As shown in FIG. 2A, modular container 200 may be a storage container having compartment 206 sized and shaped to receive a package to be delivered. Modular container 200 includes top side 202 and bottom side 204. For illustrative purposes, FIG. 2A illustrates top side 202 as above bottom side 204, e.g., relative to the ground, however, as described in further detail below, modular container 200 may be flipped such that bottom side 204 may be above top side 202 relative to the ground. Moreover, top side 202 may have an opening for access to compartment 206; whereas, bottom side 204 may include a bottom surface that encloses compartment 206. Accordingly, a package within compartment 206 may sit on the bottom surface of modular container 200.

A first lateral wall of modular container 200 may include a set of rails 210 extending along the top edge of the first lateral wall, e.g., at top side 202. In addition, a second lateral wall of modular container 200 opposite to the first lateral wall may include a set of tracks 212 extending along the top edge of the second lateral wall, e.g., at top side 202. Tracks 212 may have a track geometry sized and shaped to slidably receive rails 210, such as a dovetail configuration or the like. Accordingly, rails 210 have a rail geometry sized and shaped to be slidably received by the tracks 212. Moreover, the first lateral wall of modular container 200 may include a set of tracks extending along the bottom edge of the first lateral wall, e.g., at bottom side 204, which may be identical to tracks 212, and the second lateral wall of modular container 200 may include a set of rails extending along the bottom edge of the second lateral wall, e.g., at bottom side 204, which may be identical to rails 210.

As shown in FIG. 2A, rails 210 on the top edge of the first lateral wall may include two rail segments. Moreover, the tracks on the bottom edge of the first lateral wall also may include two track segments. Each of the track segments on the bottom edge of the first lateral wall are aligned with each of the rail segments on the top edge of the first lateral wall. Similarly, tracks 212 on the top edge of the second lateral wall may include two track segments, and the rails on the bottom edge of the second lateral wall also may include two rail segments. Each of the rail segments on the bottom edge of the second lateral wall are aligned with each of the track segments on the top edge of the second lateral wall. Moreover, the rail segments of rails 210 may be offset from the track segments of tracks 212 so that when modular container 200 is flipped 180 degrees, tracks 212 of the second lateral wall will be in the same position as where the tracks of the first lateral wall were prior to the flip, and accordingly, rails 201 of the first lateral wall will be in the same position as where the rails of the second lateral wall were prior to the flip. As will be understood by a person having ordinary skill in the art, the sets of rails and tracks of modular container 200 may include less or more than two rail segments and track segments, respectively.

Further, modular container 200 may include slidable rear door 208. Door 208 may transition between an open configuration where door 208 is positioned adjacent to the bottom surface of modular container 200 and a closed configuration, as shown in FIG. 2A, where door 208 is perpendicular to the bottom surface of modular container 200 and extends along the rear edges of the first and second lateral walls. Accordingly, the modular container 200 may include a door track extending along and adjacent to bottom side 204 and the rear edges of the first and second lateral walls, such that door 208 may slide along the door track between the open and closed configurations.

Additionally, as shown in FIG. 2A, modular container 200 may include one or more display screens 216, e.g., on the exterior surface of the first and/or second lateral wall, and display screen 218 on the exterior surface of a front wall of modular container 200. As described in further detail below, screens 216 and 218 may display information indicative of status of modular robot 100 or delivery status. Accordingly, modular container 200 may include electric throughout 214 for electrically linking modular container 200 with lid 300 and base 400, and thereby power the electrical components of modular container 200, e.g., display screens 216 and 218, compartment 206, door 208, conveyor belt 220, etc.

Lid 300 may have a lower surface and an upper surface. Lid 300 also may include a set of rails having the rail geometry and tracks having the track geometry, e.g., disposed along the lower surface of lid 300. Specifically, the set of tracks of lid 300 may be aligned with rails 210 of the first lateral wall of modular container 200 and the set of rails of lid 300 may be aligned with tracks 212 of the second lateral wall of modular container 200, such that lid 300 may releasably engage with top side 202 of modular container 200. Accordingly, when modular container 200 is flipped 180 degrees, the set of tracks of lid 300 may be aligned with the set of rails of the second lateral wall of modular container 200 and the set of rails of lid 300 may be aligned with the set of tracks of the first lateral wall of modular container 200, such that lid 300 may releasably engage with bottom side 204 of modular container 200. In addition, lid 300 may include a user interface on its upper surface for directly receiving commands from a user, as described in further detail with regard to FIG. 3. Accordingly, lid 300 further may include an electrical and data link for electrically linking lid 300 to modular container 200 and base 400, to thereby power the user interface.

Base 400 may have a lower surface and an upper surface. The lower surface of base 400 may be removeably coupled to, e.g., a base component having a plurality of omnidirectional wheels 408. Base 400 also may include a set of rails having the rail geometry and tracks having the track geometry, e.g., disposed along the upper surface of base 400. Specifically, the set of rails of base 400 may be aligned with the set of tracks of the first lateral wall of modular container 200 and the set of tracks of base 400 may be aligned with the set of rails of the second lateral wall of modular container 200, such that base 400 may releasably engage with bottom side 204 of modular container 200. Accordingly, when modular container 200 is flipped 180 degrees, the set of rails of base 400 may be aligned with tracks 212 of the second lateral wall of modular container 200 and the set of tracks of base 400 may be aligned with rails 210 of the first lateral wall of modular container 200, such that base 400 may releasably engage with top side 202 of modular container 200. Moreover, in the same manner, lid 300 may releasably engage with base 400, e.g., with no modular containers therebetween, by aligning the sets of rails and tracks of lid 300 with the sets of tracks and rails of base 400. In addition, base 400 may include a plurality of sensors and/or cameras for self-driving of modular robot 100. Additionally or alternatively, modular container 200 also may include a plurality of sensors and/or cameras for self-driving of modular robot 100.

Figure 2B:
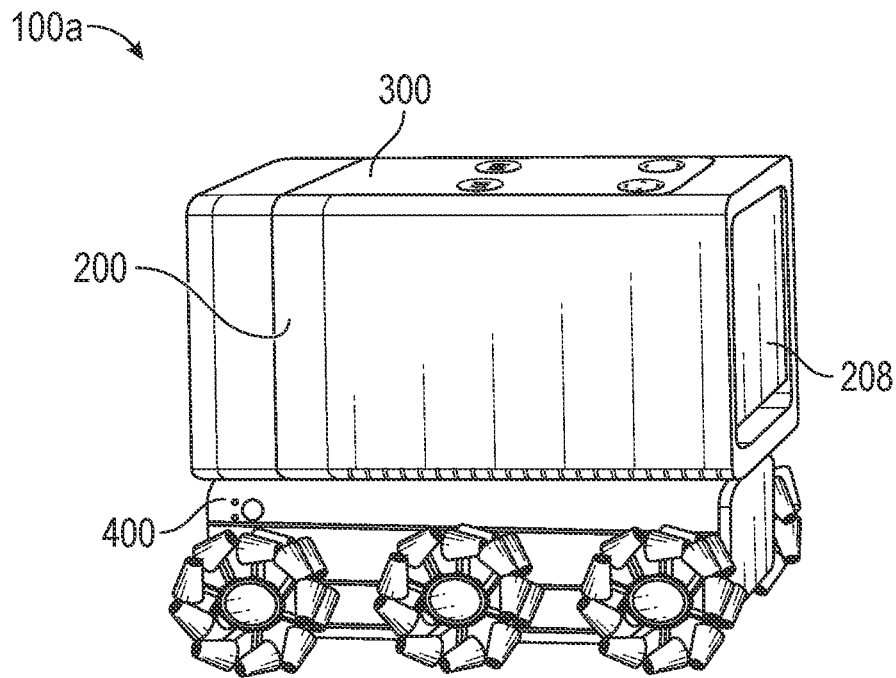
FIGS. 2B to 2D illustrate various configurations of the interlocking reconfigurable modular robot in accordance with the principles of the present disclosure.
Figure 2C:
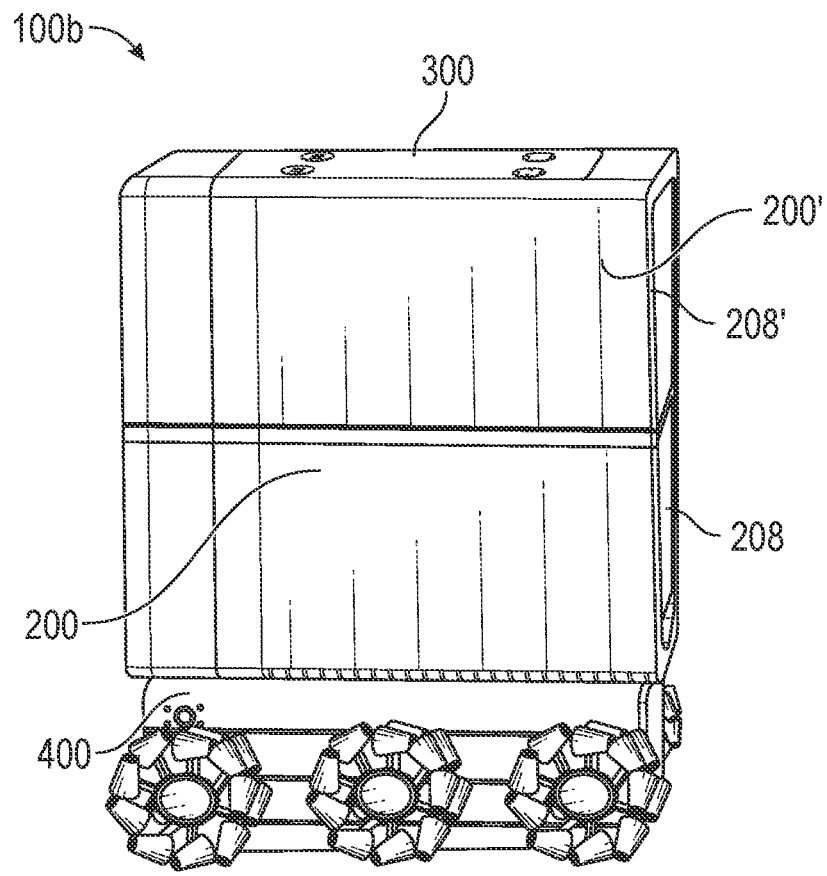

FIG. 2B illustrates one of the configurations of modular robot 100, e.g., modular robot 100a, which includes base 400, modular container 200, and lid 300. Accordingly, modular robot 100a may receive a package up to a first size, e.g., a small package via door 208. FIG. 2C illustrates another configuration of modular robot 100, e.g., modular robot 100b, which includes base 400, two modular containers, e.g., modular container 200 and modular container 200', and lid 300. As shown in FIG. 2C, modular containers 200, 200' are stacked such that the top sides of both modular containers 200, 200' are above the bottom sides of modular containers 200, 200', respectively. Accordingly, the compartment of modular robot 100b will include two separate compartments, e.g., separated by the bottom surface of modular container 200'. Doors 208, 208' may provide access into the separate compartments of modular containers 200, 200', respectively.

Figure 2D:
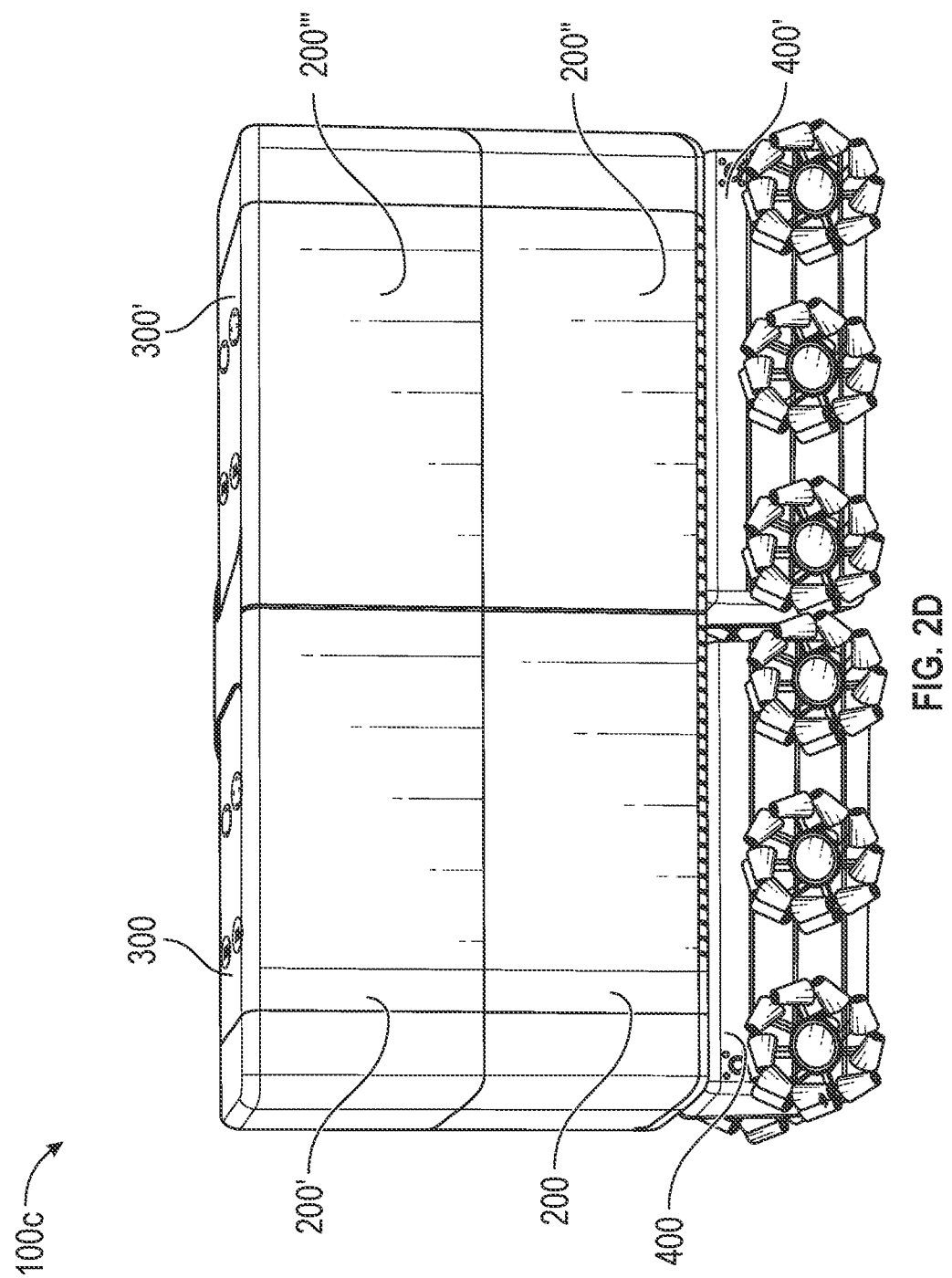

FIG. 2D illustrates yet another configuration of modular robot 100, e.g., modular robot 100c, which includes base 400, base 400', modular container 200, modular container 200', modular container 200", modular container 200''', lid 300, and lid 300'. Base 400, modular containers 200, 200', and lid 300 may form a first modular robot similar to modular robot 100b, and base 400', modular containers 200", 200''', and lid 300' may form a second modular robot similar to modular robot 100b. The first and second modular robots may be releasably coupled, e.g., via their respective rear edges, to form modular robot 100c, as described in further detail below.

Figure 3:
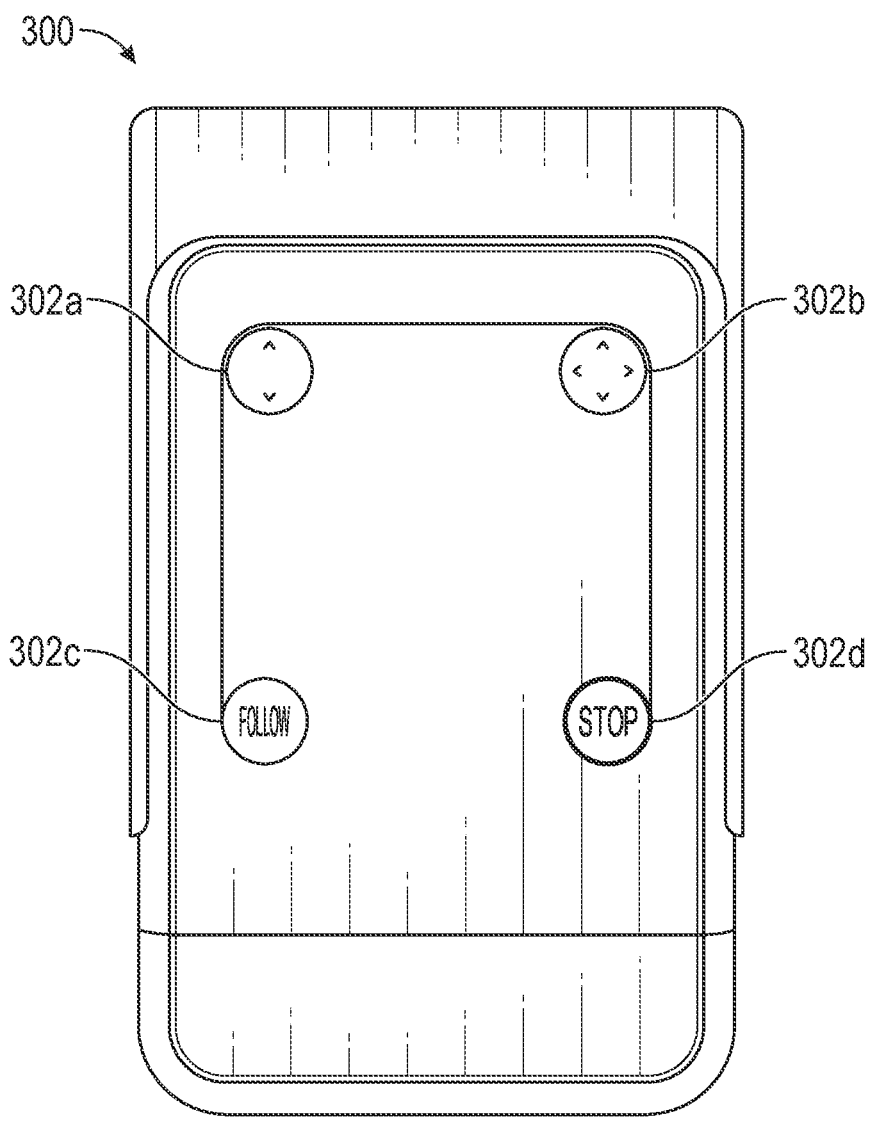
FIG. 3 illustrates an exemplary lid of the interlocking reconfigurable modular robot in accordance with the principles of the present disclosure.

Referring now to FIG. 3, an exemplary lid is provided. As described above, lid 300 may include a user interface on its upper surface. As shown in FIG. 3, the user interface may include actuators 302a for controlling height adjustment of the modular robot, 302b for controlling fine movement of the modular robot, 302c for initiating the follow command of the modular robot, e.g., to begin a delivery process such as by locating the package to be delivered within a warehouse, and 302d for initiating the stop command of the modular robot. Accordingly, when a delivery has been initiated, modular robot 100, using sensors and cameras, may self-navigate to the package to be delivered, and then onto a delivery vehicle.

Figure 4A:
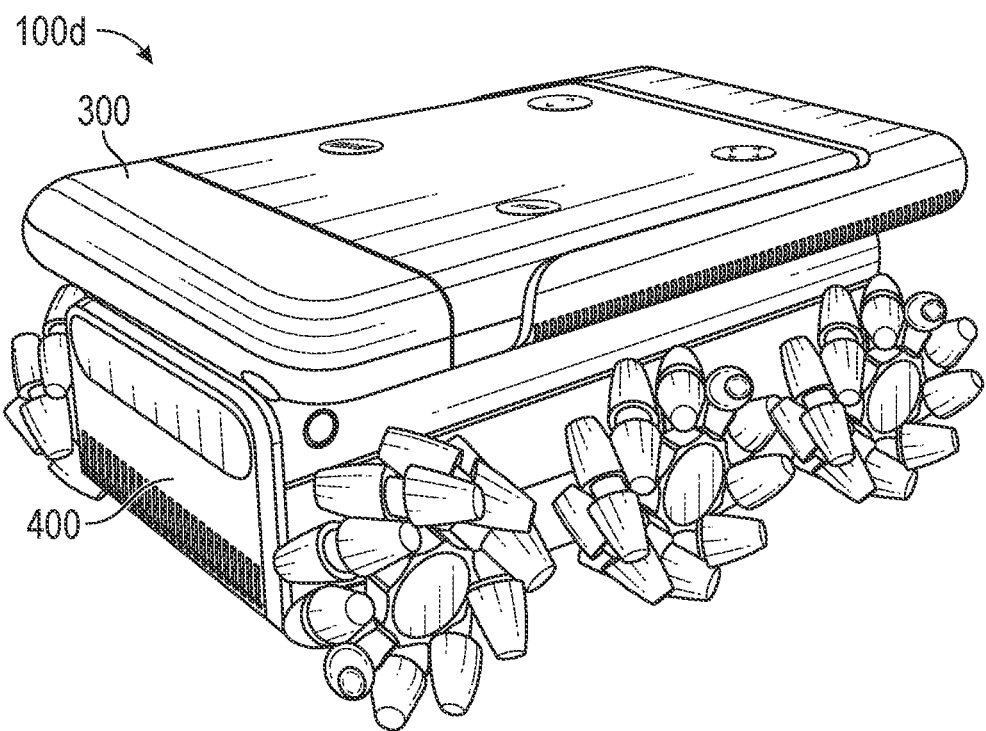
FIGS. 4A to 4M illustrates various configurations of the interlocking reconfigurable modular robot in accordance with the principles of the present disclosure.
Figure 4B:
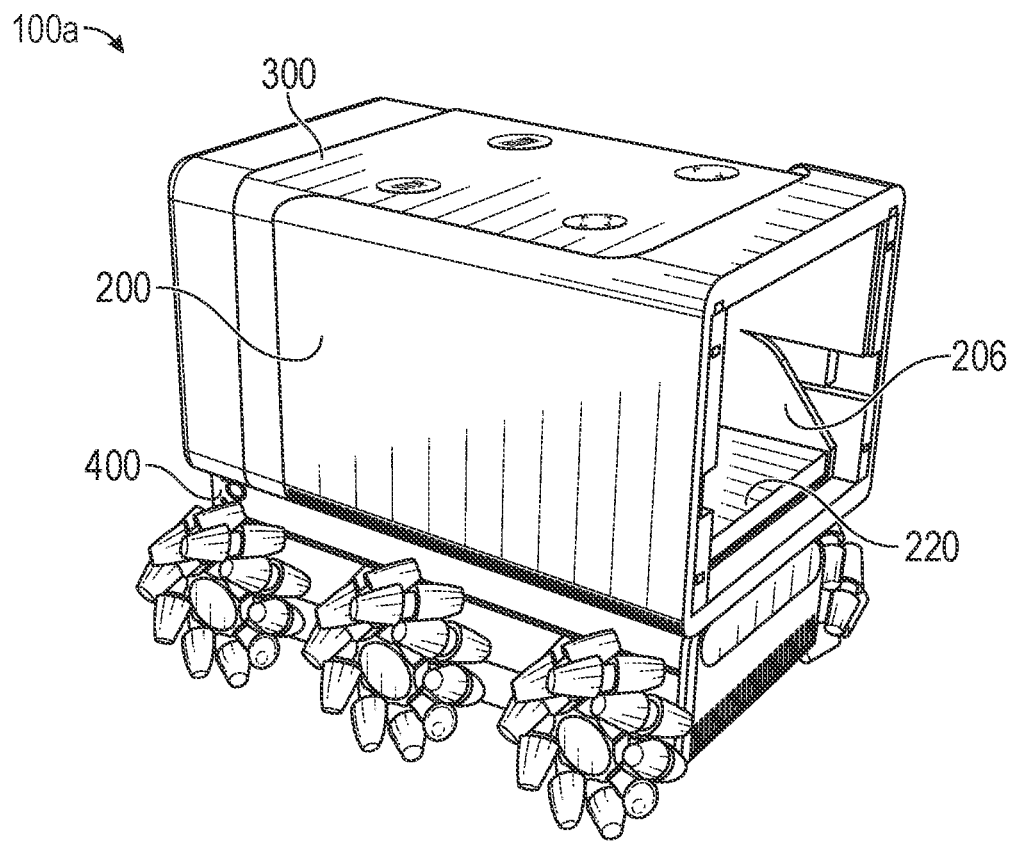
Figure 4C:
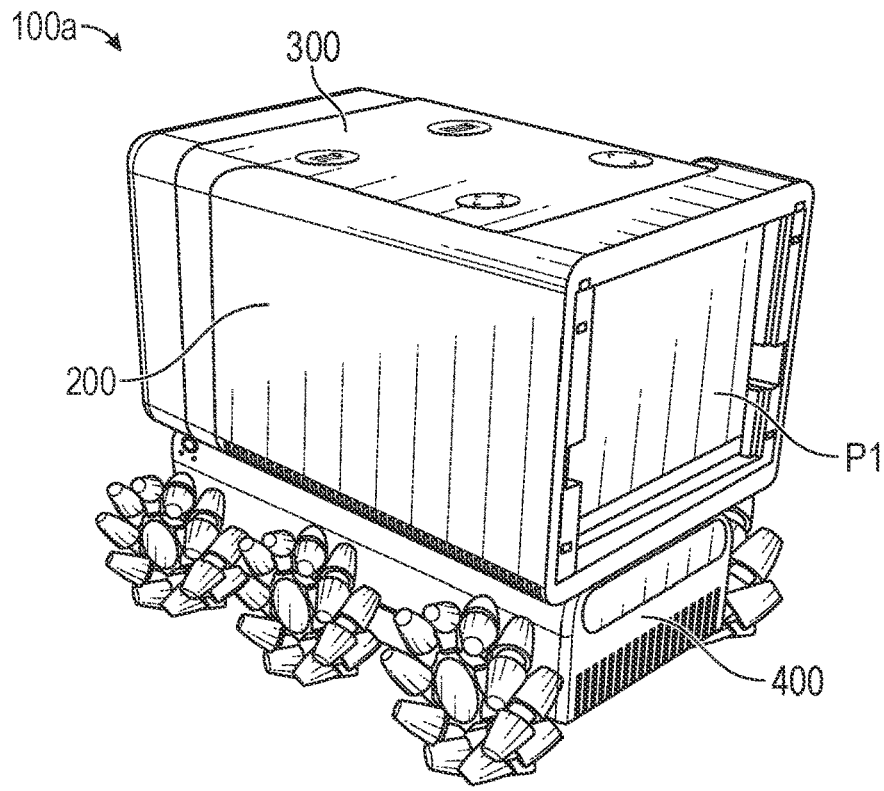

Referring now to FIGS. 4A to 4M, the transition between the various configurations of the interlocking reconfigurable modular robot is provided. FIG. 4A, illustrates a configuration of modular robot 100, e.g., modular robot 100d, which includes base 400 and lid 300, without any modular containers therebetween. Lid 300 may be disengaged from base 400, and modular container 200 may be releasably engaged with base 400 and lid 300, e.g., manually, to form modular robot 100, as shown in FIG. 4B. Accordingly, compartment 206 of modular robot 100a may receive a package up to a first size, e.g., package P1, as shown in FIG. 4C. As shown in FIG. 4B, an interior surface of the bottom surface of modular container 200 may include conveyor belt 220. Conveyor belt 220 may be actuated to facilitate loading and/or unloading of a package into compartment 206.

Figure 4D:
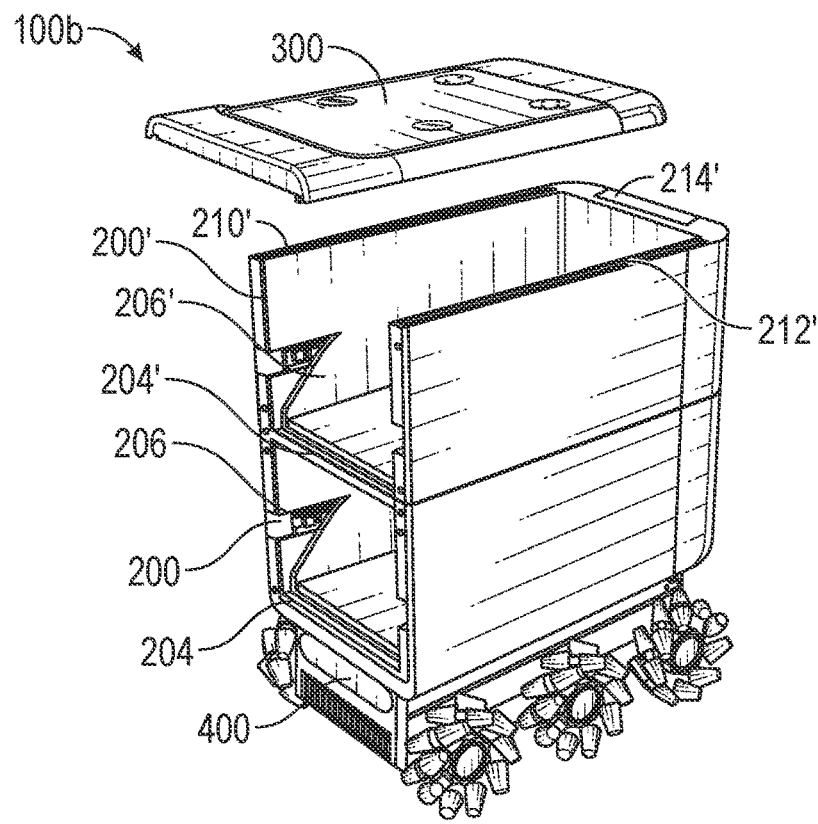
Figure 4E:
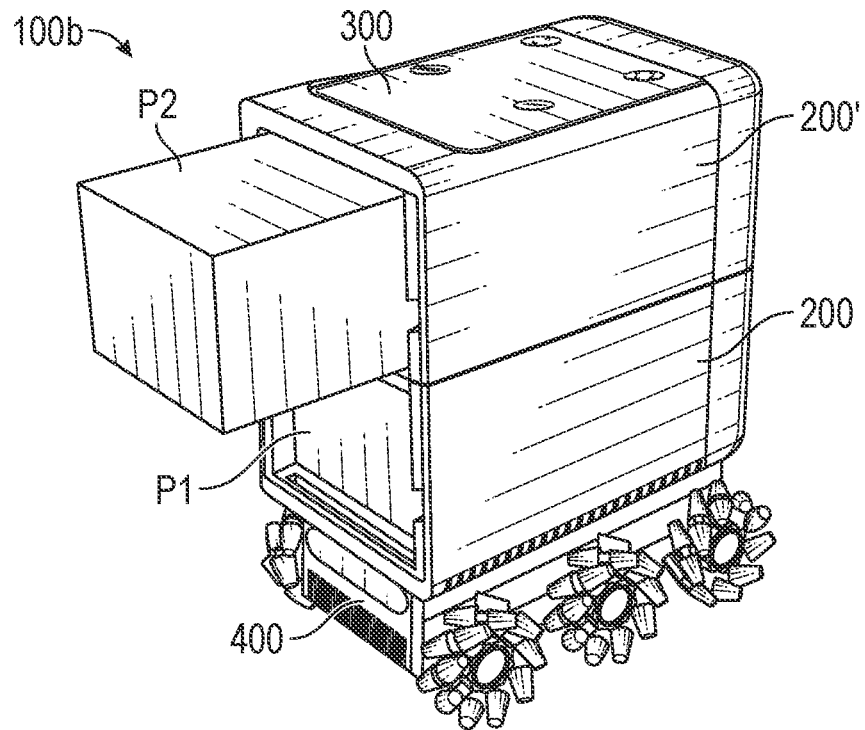

As shown in FIG. 4D, lid 300 may be disengaged from top side 202 of modular container 200, and the bottom side of a second modular container, e.g., bottom side 204' of modular container 200', may releasably engage with top side 202 of modular container 200. Lid 300 may then be releasably engaged with top side 202' of modular container 200', thereby forming modular robot 100b having compartment 206 and compartment 206'. Accordingly, as shown in FIG. 4E, compartment 206 may receive a first package, e.g., P1, and compartment 206 may receive a second package, e.g., P2, up to the same maximum size of P1.

Figure 4F:
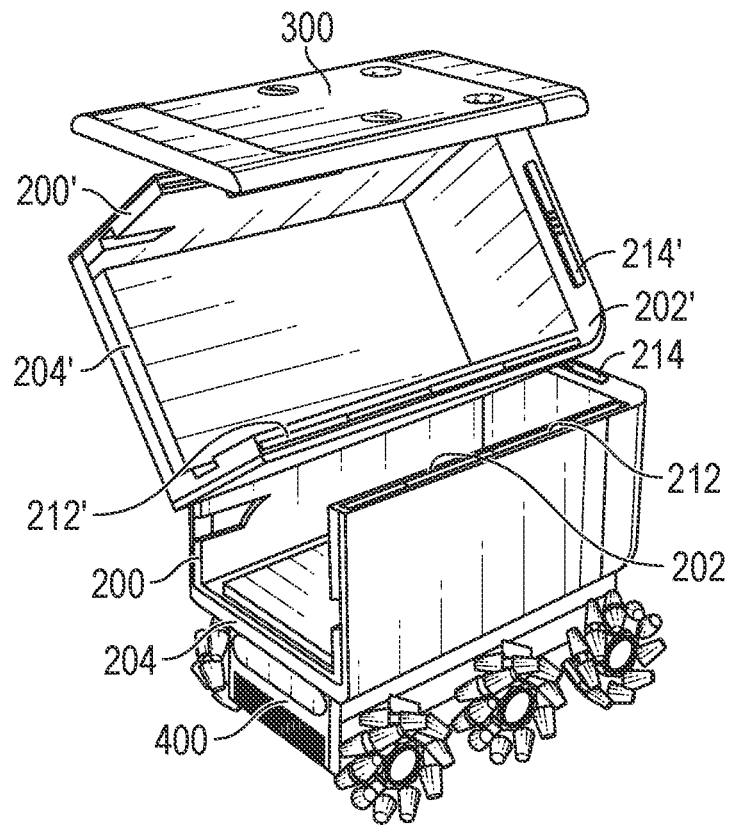
Figure 4G:
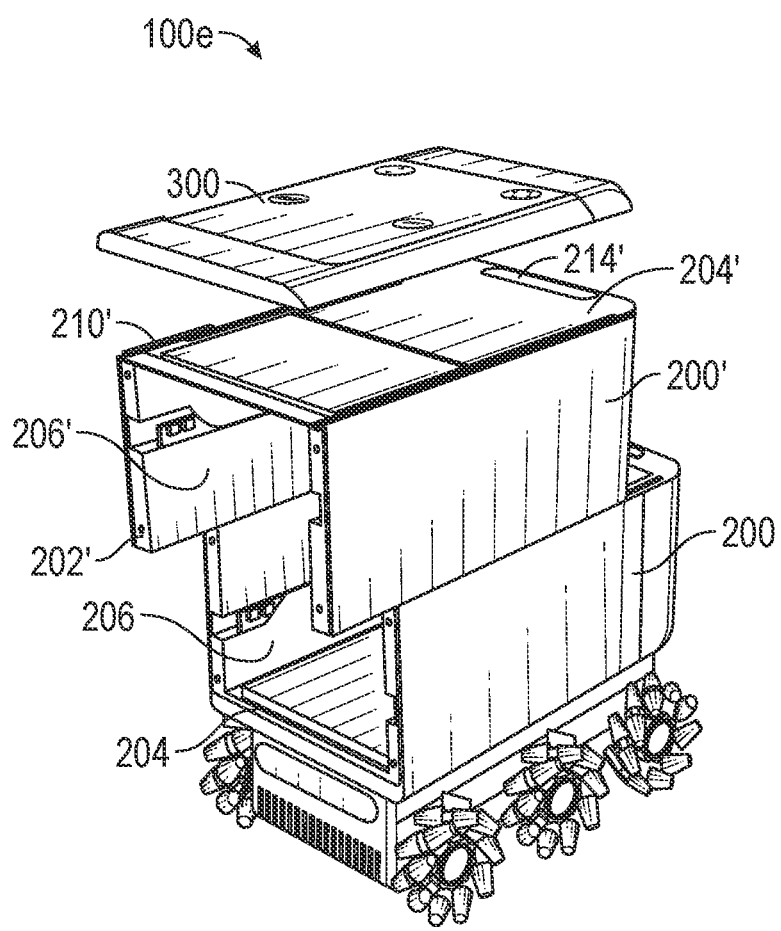
Figure 4H:
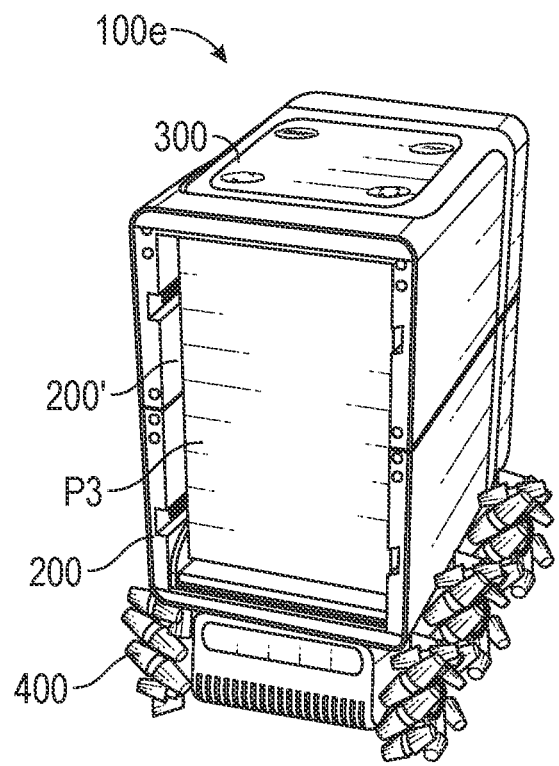

As shown in FIG. 4F, lid 300 may be disengaged from top side 202' of modular container 200', and modular container 200' may be disengaged from modular container 200, such that modular container 200' may be flipped 180 degrees and releasably engaged with modular container 200. For example, top side 202' of modular container 200' may be releasably engaged with top side 202 of modular container 200 to form modular robot 100e, as shown in FIG. 4G. Lid 300 may then be releasably engaged with bottom side 204' of modular container 200'. As shown in FIG. 4G, the compartment of modular robot 100e may be formed by compartment 206 and compartment 206' without any surface therebetween. Accordingly, the compartment of modular robot 100e may be sized and shaped to receive a third package, e.g., P3 having a size up to the maximum size of the sum of compartments 206 and 206', as shown in FIG. 4H.

Figure 4I:
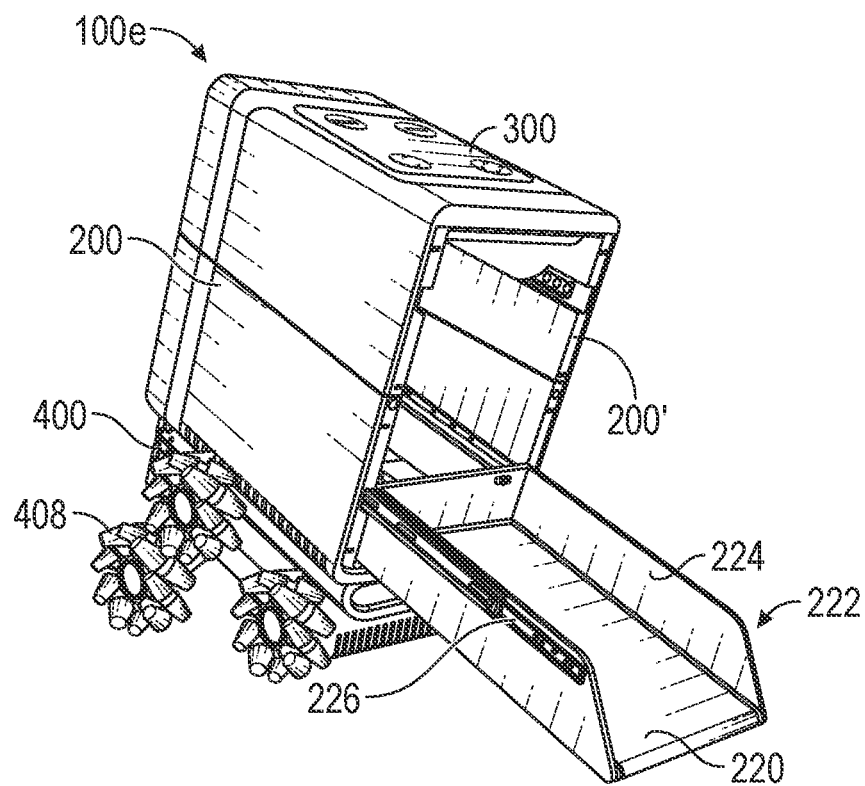

As shown in FIG. 4I, wheels 408 of base 400 may be actuated to change the angle of base 400 relative to the ground. Accordingly, slidable ramp 222 may be actuated to controllably slide out of modular container 200, thereby forming a ramp with the ground. Slidable ramp may include side walls 224 and sliding rails 226 disposed on an exterior surface of side walls 224 for sliding along a corresponding track extending along an interior surface of the first and second lateral walls of modular container 200. In addition, conveyor belt 220 may be actuated to facilitate loading and/or unloading of a package to be delivered when ramp 222 is deployed.

Figure 4J:
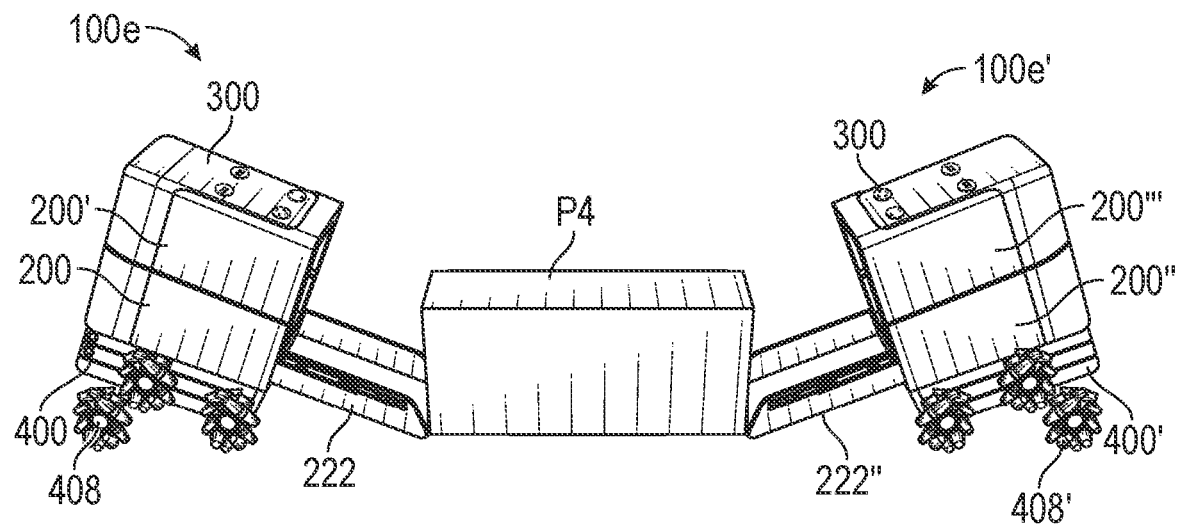
Figure 4K:
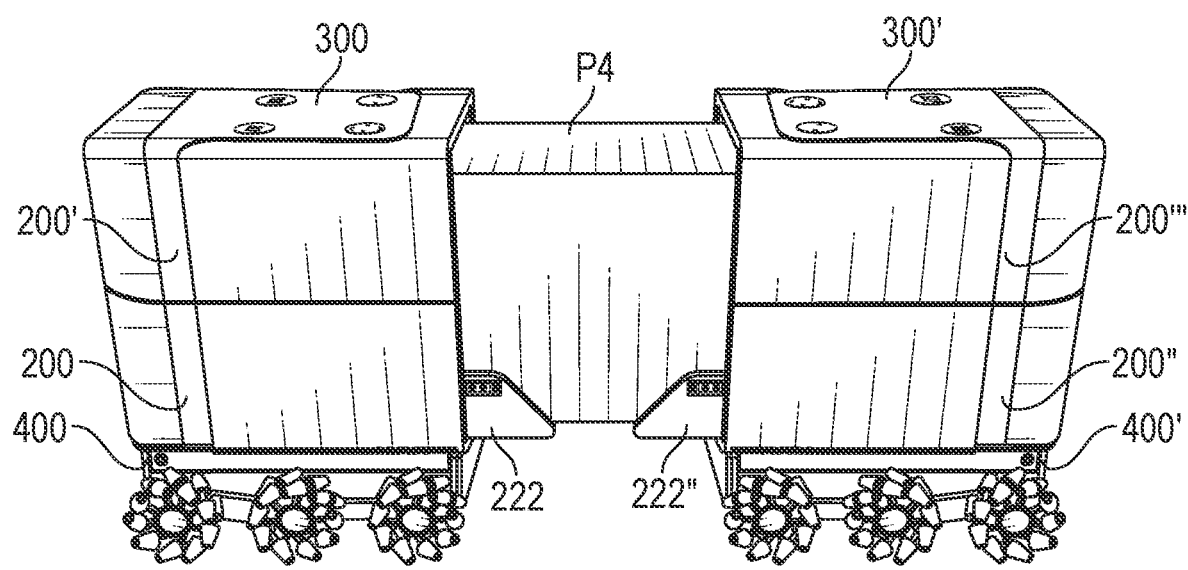
Figure 4L:
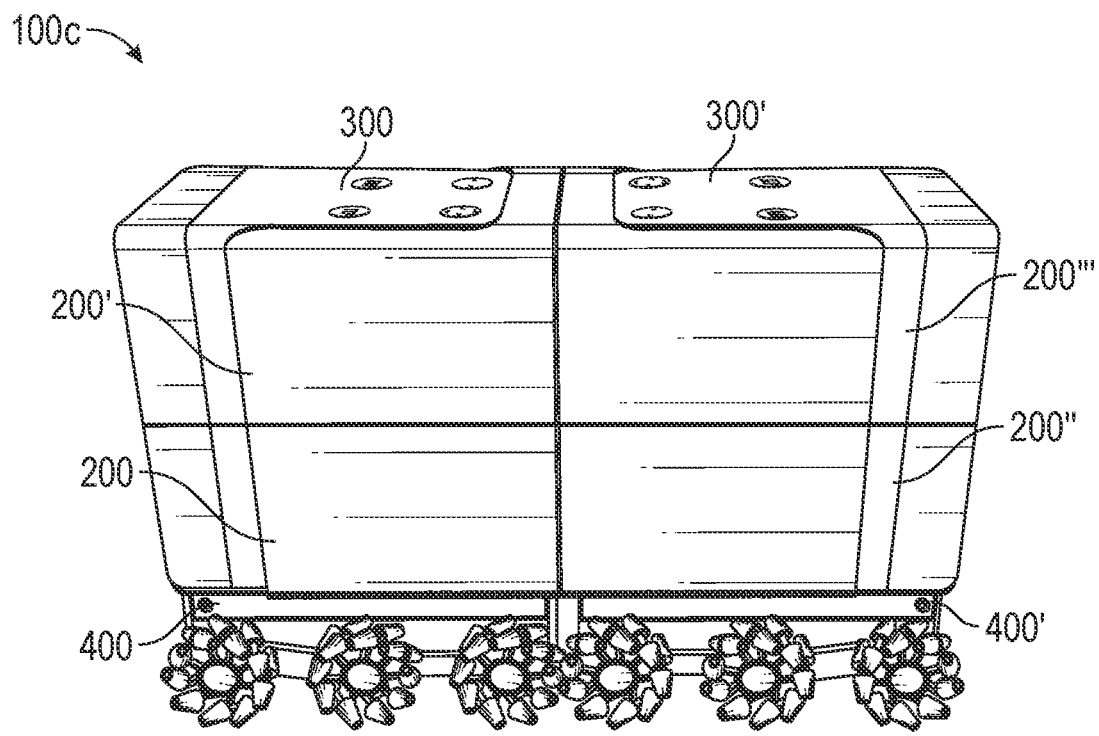
Figure 4M:
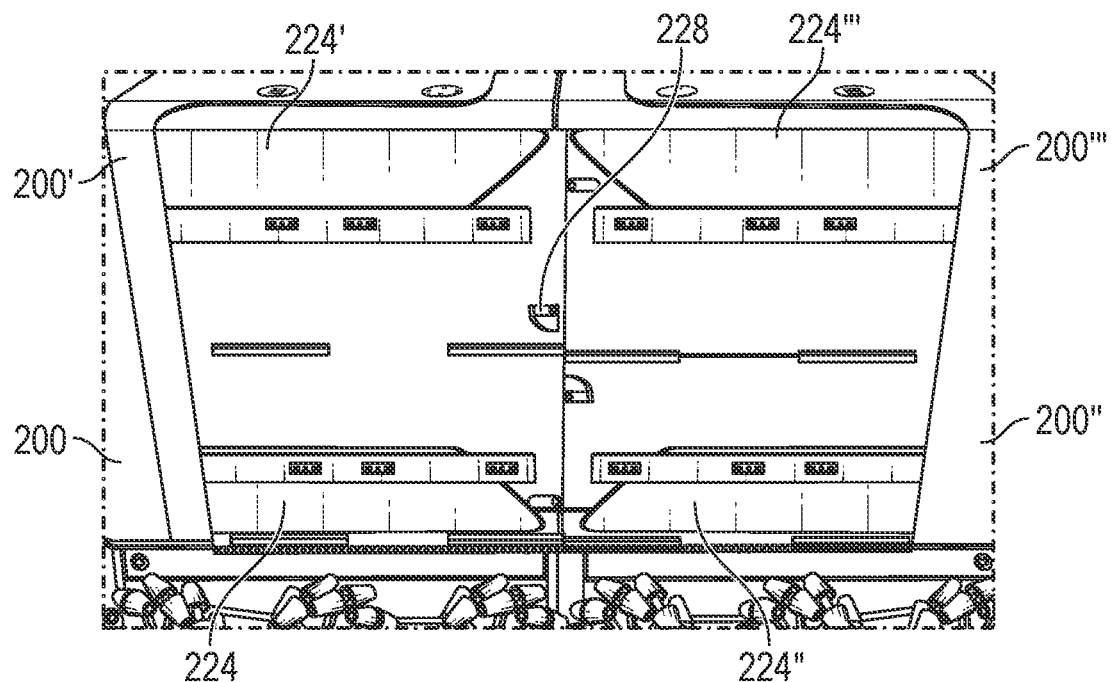

As shown in FIG. 4J, two modular robots, e.g., modular robot 100e and modular robot 100e' having the same configuration as modular robot 100e, may work together to receive a fourth package, e.g., P4 having a size up to the maximum size of the sum of the compartments of modular robot 100e and modular robot 100e'. For example, wheels 408 and 408' may be actuated to cause modular robots 100e and 100e' to be angled relative to the ground, so that ramps 222 and 222' may be deployed at an angle to the ground, adjacent to P4. Next, modular robots 100e and 100e' may move toward each other while wheels 408 and 408' return to a leveled configuration such that P4 rests parallel to the ground on both ramps 222 and 222', as shown in FIG. 4K. Modular robots 100e and 100e' will continue to move toward each other until the rear edges of modular robots 100e and 100e' meet to thereby form modular robot 100c, as shown in FIG. 4L. As shown in FIG. 4M, locking system 228 may be engaged to releasably couple modular robots 100e and 100e' of modular robot 100c.

Referring now to FIG. 5, display screens 216 and 218 are described. As shown in FIG. 5, screens 216 and 218 may be formed of a plurality of pixel LED lights, covered by a protection screen. Screen 216 and screen 218 may display information indicative of the status of modular robot 100 or delivery status. As shown in FIG. 5, screen 216 may display a warning sign, and screen 218 may express an "emotion" of modular robot 100. For example, when screen 216 displays the warning sign, screen 218 expresses an alerted expression, e.g., big eyes. When multiple modular containers are coupled together, their respective screens may be actuated to function together, thereby forming a single large screen for displaying information.

Figure 6A:
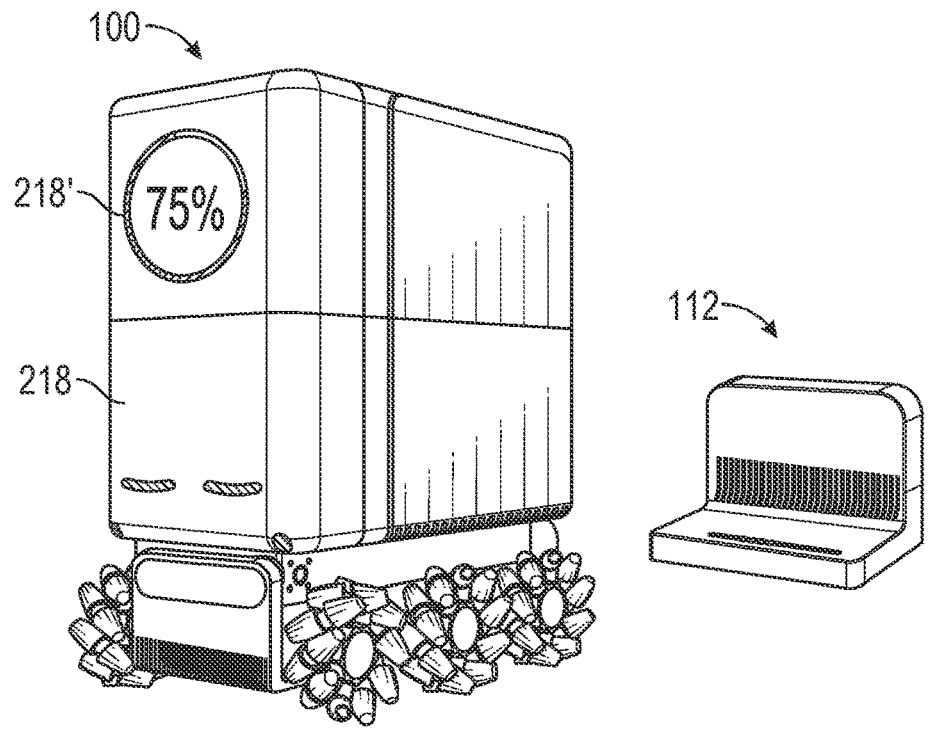
FIGS. 6A and 6B illustrate various informative displays of the interlocking reconfigurable modular robot in accordance with the principles of the present disclosure.

As shown in FIG. 6A, system 10 further may include external charger 112 for charging modular robot 100. Accordingly, charger 112 may have a geometry corresponding with the charge port of modular robot 100. As shown in FIG. 6A, screen 218 may express a "sleepy" expression, e.g., while modular robot 100 is charging, and screen 218' may display information indicative of the status of modular robot 100, e.g., battery/charge level.

Figure 6B:
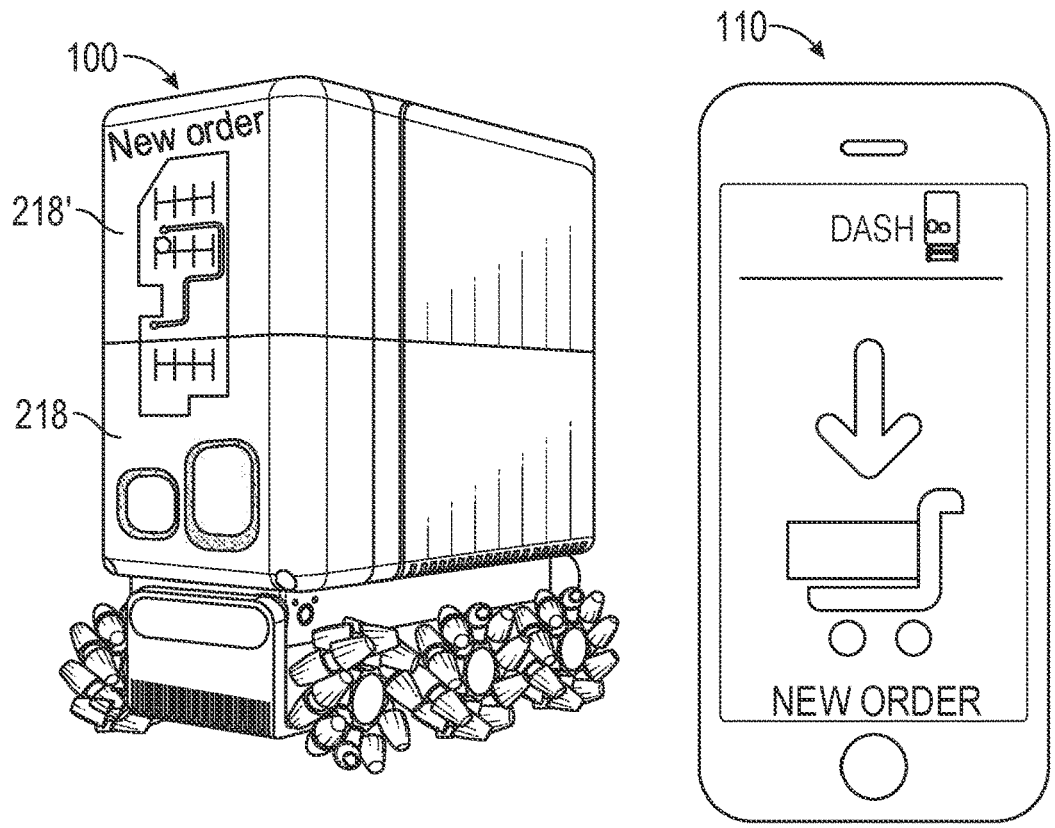

As shown in FIG. 6B, when a new order is initiated, e.g., when a package is ready to be picked up for delivery, mobile application 110 may display a notification that the new order is ready for pickup. Additionally, screen 218 may express an "awake" expression, and screens 218 and 218' together may display a map, e.g., of the warehouse whether the package is located as well as the location in the warehouse where the package is located and the path for modular robot 100 to get to the package. Additionally or alternatively, screens 216 and 216' also may display the map. After the package has been loaded into modular robot 100, the displays screen may display additional information such as estimated time of arrival of the delivery, etc.

Figure 7A:
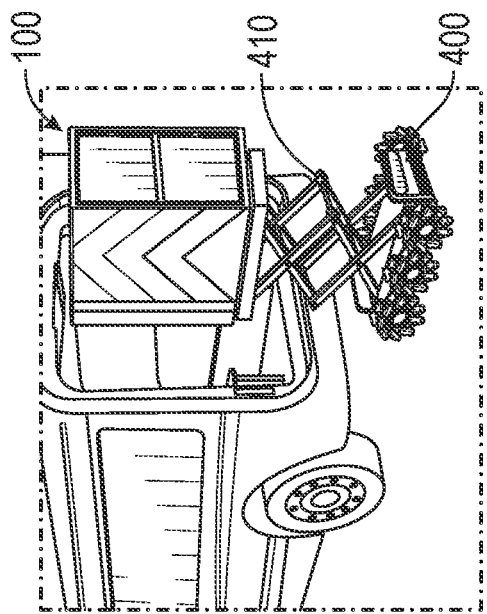
FIGS. 7A to 7D illustrate self-loading of the interlocking reconfigurable modular robot into a delivery vehicle in accordance with the principles of the present disclosure.
Figure 7B:
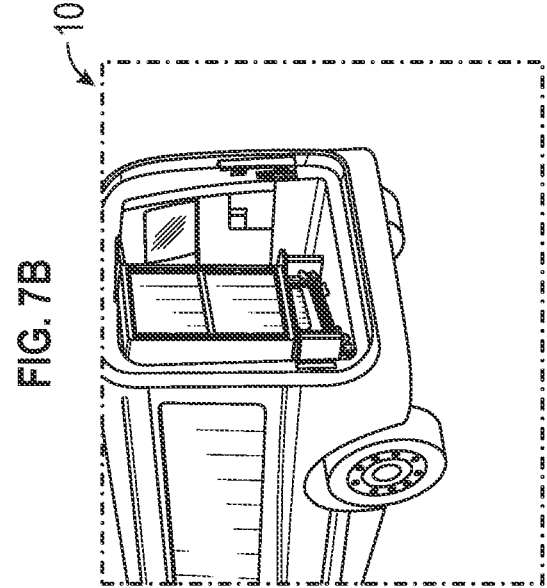
Figure 7C:
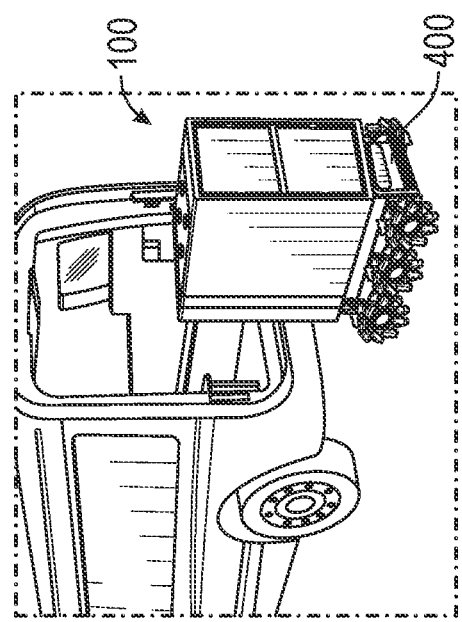
Figure 7D:
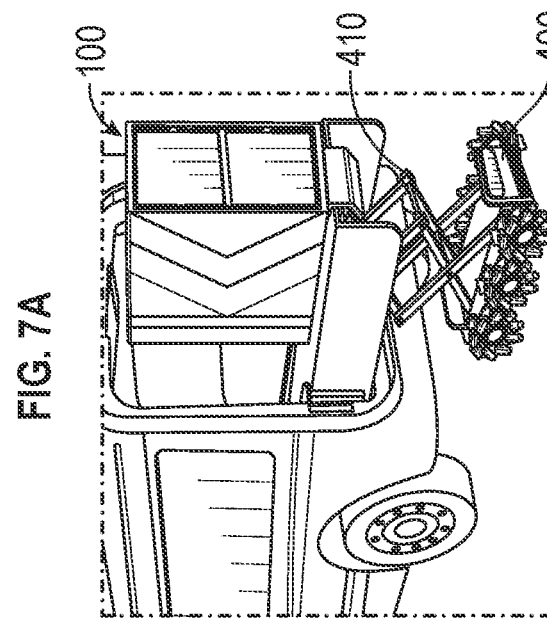

Referring now to FIG. 7A to 7D, self-loading of modular robot 100 onto a delivery vehicle is described. As shown in FIG. 7A, modular robot may approach the delivery vehicle, e.g., at the rear of the delivery vehicle. As shown in FIG. 7B, base 400 of modular robot 100 may include scissor lift 410, which may expand and retract to adjust the height of modular robot 100. As shown in FIG. 7B, as scissor lift 410 is actuated to raise modular robot 100, the display screens of modular robot 100 may display upward facing arrows indicating that that modular robot 100 is being raised. As shown in FIG. 7C, base 400 may deploy guide rails to facilitate loading of modular robot 100 onto the delivery vehicle. As modular robot 100 is loaded into the delivery vehicle, the display screen may display arrows in the direction of movement of modular robot 100. Scissor lift 410 may be contracted before completely loading modular robot 100 into the delivery vehicle. FIG. 7D illustrates modular robot 100 fully loaded into the delivery vehicle.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, and/or wireless data links) through a network, both perform tasks. In a distributed system environment, program modules may be located in both the local and remote memory storage devices.

Further, where appropriate, the functions described herein may be performed in one or more of hardware, software, firmware, digital components, or analog components. For example, one or more application specific integrated circuits (ASICs) may be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed:

1. A system for delivering items of varying sizes, the system comprising:
   one or more modular containers, each of the one or more modular containers having first and second lateral walls, a top side, and a bottom side having a bottom surface, a top edge of the first lateral wall comprising a first rail having a rail geometry configured to releasably engage with a track geometry, a bottom edge of the first lateral wall comprising a first track having the track geometry configured to releasably engage with the rail geometry, a top edge of the second lateral wall comprising a second track having the track geometry, a bottom edge of the second lateral wall comprising a second rail having the rail geometry;
   a lid having an upper surface and a lower surface configured to be releasably coupled to both the top side and the bottom side of the one or more modular containers, the lid comprising a third track having the track geometry and a third rail having the rail geometry; and
   a base having a lower surface and an upper surface configured to be releasably coupled to both the top side and the bottom side of the one or more modular containers, the base comprising a fourth rail having the rail geometry and a fourth track having the track geometry,
   wherein each of the one or more modular containers comprise a slidable ramp configured to slide between a retracted configuration within the one or more modular containers and a protracted configuration beyond a back side of the one or more modular containers, wherein the base comprises a plurality of omni-directional wheels, wherein, responsive to actuation of at least two of the plurality of wheels is configured to cause the at least two of the plurality of wheels to transition from a first configuration where the base is parallel to a ground to a second configuration where the base is angled relative to the ground, thereby allowing the slidable ramp to be deployed in the protracted position at an angle to the ground.

2. The system of claim 1, wherein the slidable ramp comprises a conveyor belt.

3. The system of claim 1, wherein each of the one or more modular containers have a door track and a slidable back wall, the slidable back wall configured to transition between an open configuration along the bottom surface and a closed configuration perpendicular to the bottom surface, and wherein, when the slidable back wall transitions between the open and closed configurations, the slidable back wall slides along the door track.

4. The system of claim 1, wherein each of the one or more modular containers have a front wall, the front wall comprising a screen configured to display information indicative of at least one of modular container status or a delivery status.

5. The system of claim 1, wherein an outer surface of at least one of the first lateral wall or the second lateral wall comprises a screen configured to display information indicative of at least one of modular container status or a delivery status.

6. The system of claim 1, wherein the upper surface of the lid comprises a user interface configured to receive user input, the user input configured to control the system.

7. The system of claim 1, wherein the base comprising a rechargeable battery.

8. The system of claim 7, wherein each of the lid, the one or more modular containers, and the base comprise an electric throughput configured to electrically coupled each of the lid, the one or more modular containers, and the base.

9. The system of claim 7, further comprising an external charger configured to charge the rechargeable battery.

10. The system of claim 1, wherein the one or more modular containers comprise first and second modular containers, the first and second modular containers configured to be stacked on each other.

11. The system of claim 10, wherein the second modular container is configured to be stacked on the first modular container such that the first track of the second modular container is releasably engaged with the first rail of the first modular container and the second rail of the second modular container is releasably engaged with the second track of the first modular container.

12. The system of claim 10, wherein the second modular container is configured to be stacked on the first modular container such that the second track of the second modular container is releasably engaged with the first rail of the first modular container and the first rail of the second modular container is releasably engaged with the second track of the first modular container.

13. The system of claim 10, wherein the one or more modular containers comprise third and fourth modular containers, the third and fourth modular containers configured to be stacked on each other, wherein a back edge of the first and second lateral walls of the first modular container and the first and second lateral walls of the second modular container are configured to releasably coupled to a back edge of the first and second lateral walls of the third modular container and the first and second lateral walls of the fourth modular container, and wherein the first and third modular containers are positioned side by side and the second and fourth modular containers are positioned side by side such that the first, second, third, and fourth modular containers are configured to cooperatively contain a single package.

14. The system of claim 13, further comprising a second lid configured to be releasably coupled to the top and bottom sides of the third modular container and the top and bottom sides of the fourth modular container, the second lid configured to be releasably coupled to the lid.

15. The system of claim 13, wherein, responsive to the slidable ramps of the first and third containers sliding from the protracted positions to the retracted positions, the first and third containers are configured to move toward each other, thereby allowing the first, second, third, and fourth containers to cooperatively contain the single package.

16. The system of claim 1, wherein the third track of the lid is configured to releasably engage with the fourth rail of the base and the third rail of the lid is configured to releasably engage with the fourth track of the base.

17. The system of claim 1, wherein the base comprises a scissor lift configured to adjust a height of the base relative to a ground.

18. The system of claim 1, further comprising a mobile application operatively coupled to the one or more containers, the mobile application configured to receive at least one of modular container status or a delivery status from the one or more containers.

19. The system of claim 1, wherein the at least two of the plurality of wheels comprises a first wheel and a second wheel, and wherein, when the at least two of the plurality of wheels are in the second configuration, the first and second wheels are stacked on top of each other such that the first wheel engages the ground and the second wheel is spaced from the ground and disposed between the first wheel and the one or more modular containers.

20. The system of claim 1, wherein each of the one or more modular containers further comprises a track extending along an interior surface thereof, wherein the slidable ramp comprises side walls and sliding rails disposed on an exterior surface of the side walls of the slidable ramp, and wherein the sliding rails are configured to slide along the track between the retracted and protracted positions.

\* \* \* \* \*